US011567745B2

(12) United States Patent
Chen et al.

(10) Patent No.: US 11,567,745 B2
(45) Date of Patent: Jan. 31, 2023

(54) COMPILER ADAPTED IN GRAPHICS PROCESSING UNIT AND NON-TRANSITORY COMPUTER-READABLE MEDIUM

(71) Applicant: NATIONAL CHENG KUNG UNIVERSITY, Tainan (TW)

(72) Inventors: Chung-ho Chen, Tainan (TW); Dun-jie Chen, Tainan (TW); Feng-ming Hsu, Tainan (TW); Sheng-yao Lin, Tainan (TW)

(*) Notice: Subject to any disclaimer, the term of this patent is extended or adjusted under 35 U.S.C. 154(b) by 47 days.

(21) Appl. No.: 17/214,965

(22) Filed: Mar. 29, 2021

(65) Prior Publication Data

US 2022/0206768 A1 Jun. 30, 2022

(30) Foreign Application Priority Data

Dec. 30, 2020 (TW) ................................ 109146968

(51) Int. Cl.
*G06F 8/41* (2018.01)
*G06F 9/38* (2018.01)

(52) U.S. Cl.
CPC ............ *G06F 8/443* (2013.01); *G06F 9/3804* (2013.01); *G06F 9/3885* (2013.01)

(58) Field of Classification Search
CPC ....... G06F 8/443; G06F 9/3804; G06F 9/3885
USPC ................................................. 717/140–148
See application file for complete search history.

(56) References Cited

U.S. PATENT DOCUMENTS

| | | | | |
|---|---|---|---|---|
| 5,179,702 A | * | 1/1993 | Spix ...................... | G06F 9/3838 717/124 |
| 5,577,253 A | * | 11/1996 | Blickstein ............... | G06F 8/447 717/146 |
| 5,613,117 A | * | 3/1997 | Davidson ................ | G06F 8/447 717/146 |
| 5,966,539 A | * | 10/1999 | Srivastava ............ | G06F 8/4435 717/160 |

(Continued)

FOREIGN PATENT DOCUMENTS

CN 112035397 A 12/2020

OTHER PUBLICATIONS

Tanenbaum et al, "Using Peephole Optimization on Intermediate Code", ACM, pp. 21-32 (Year: 1982).*

(Continued)

*Primary Examiner* — Anil Khatri

(57) ABSTRACT

A compiler includes a front-end module, an optimization module, and a back-end module. The front-end module pre-processes a source code to generate an intermediate code. The optimization module optimizes the intermediate code. The back-end module translates the optimized intermediate code to generate a machine code. Optimization includes translating a branch instruction in the intermediate code into performing the following operations: establishing a post dominator tree for the branch instruction to find an immediate post dominator of the branch instruction as a reconverge point of a first path and a second path of the branch instruction; inserting a specific instruction at the front end of the reconverge point, so as to jumping to execute the instructions of the second path on the condition that once the specific instruction on the first path is executed.

8 Claims, 6 Drawing Sheets

(56) References Cited

U.S. PATENT DOCUMENTS

| | | | |
|---|---|---|---|
| 6,173,444 B1 * | 1/2001 | Archambault | G06F 8/443 |
| | | | 717/145 |
| 6,243,864 B1 * | 6/2001 | Odani | G06F 8/443 |
| | | | 717/154 |
| 6,260,190 B1 * | 7/2001 | Ju | G06F 8/445 |
| | | | 712/205 |
| 6,317,871 B1 * | 11/2001 | Andrews | G06F 8/51 |
| | | | 717/137 |
| 6,751,792 B1 * | 6/2004 | Nair | G06F 8/443 |
| | | | 717/161 |
| 7,254,809 B2 * | 8/2007 | Kurhekar | G06F 8/51 |
| | | | 717/149 |
| 8,387,036 B2 * | 2/2013 | Rose | G06F 8/4441 |
| | | | 717/160 |
| 8,789,032 B1 * | 7/2014 | Li | G06F 8/4443 |
| | | | 717/154 |
| 9,378,003 B1 * | 6/2016 | Sundararajan | G06F 8/456 |
| 9,563,534 B1 * | 2/2017 | Gschwind | G06F 11/3624 |
| 9,710,244 B2 * | 7/2017 | Abadi | G06F 8/75 |
| 10,769,016 B2 * | 9/2020 | Leggette | G06F 16/951 |
| 10,802,806 B1 * | 10/2020 | Haehnle | G06F 8/30 |
| 11,012,076 B1 | 5/2021 | Hyungdal et al. | |
| 2002/0095667 A1 | 7/2002 | Archambault | |
| 2007/0234276 A1 | 10/2007 | Ottoni et al. | |
| 2020/0301681 A1 * | 9/2020 | Haehnle | G06F 8/433 |

OTHER PUBLICATIONS

Davidson et al, "Code Selection through Object Code Optimization", ACM, pp. 505-526 (Year: 1984).*
Mennie et al, "Information Flow Certification Using an Intermediate Code Program Representation", IEEE, pp. 594-607 (Year: 1981).*
Bhatt et al, "Extension of Context Free Grammar for Intermediate Code and Peephole Optimization Rule parsers", IEEE, pp. 162-164 (Year: 2015).*
Dolby et al, "An Automatic Object Inlining Optimization and its Evaluation", ACM, pp. 345-357 (Year: 2000).*
Piumarta et al, "Optimizing direct threaded code by selective inlining", ACM, pp. 291-300 (Year: 1998).*
Dejean et al, "A Definition Optimization Technique Used in Code Translation Algorithm", ACM, pp. 94-105 (Year: 1989).*

* cited by examiner post dominator tree

COMPILER ADAPTED IN GRAPHICS PROCESSING UNIT AND NON-TRANSITORY COMPUTER-READABLE MEDIUM

CROSS REFERENCE TO RELATED APPLICATIONS

This application claims priority to Taiwan Application Serial Number 109146968, filed on Dec. 30, 2020, which is herein incorporated by reference in its entirety.

FIELD OF INVENTION

The present disclosure relates to the field of a compiler, and more particularly to a compiler adapted in a graphics processing unit.

BACKGROUND OF INVENTION

In recent years, with the rise of Internet of things (IOT) and the rapid development of artificial intelligence, machine learning and other fields, the amount of data processing has increased significantly. The traditional cloud computing has been unable to cope with such a large amount of real-time data processing, and thus has been replaced by the application architecture of distributed computing (e.g., fog computing, edge computing, end user computing). For example, edge computing moves computations of applications, data, and services from the central node of the network to the logical edge node of the network for processing. In other words, edge computing decomposes the large-scale services that were originally processed by the central node into small and many manageable parts, and distributes them to the edge nodes for processing. The edge node is close to the user terminal device, thus speeding up the data processing and transmission and reducing the delay.

Therefore, a general-purpose graphics processing unit (GPGPU) has been widely used in such applications that need to compute a large amount of data and can be highly parallelized. In addition to processing graphics data, such graphics processing unit can also be used to calculate the general computing tasks that were originally processed by a CPU, and was generally not associated with graphics processing. Due to the powerful parallel processing capability and programmable pipelines of the modern graphics processing unit, the performance of the GPGPU can greatly surpass that of the traditional CPU, for processing single instruction multiple data (SIMD) on the condition that the computation of data processing is much larger than that of data scheduling and transmission.

However, most GPUs use manufacturers' system architectures and compilers themselves, which usually only support applications with their own defined architectures and languages. Even if these manufacturers have released some support services for open-source software, compilers and other related software or hardware still have to use their definitions. For example, the traditional open computing language (OpenCL) compiler is AMD CLOC, which is closed source software and is only provided for X86 platform. In other words, developers are unable to modify, add instructions to, and optimize them. Therefore, there are some difficulties in the development and use. Therefore, how to provide a portable OpenCL compiler platform and an optimized compiler to improve the performance of graphics processors supporting OpenCL is a current topic.

SUMMARY OF INVENTION

One of the objectives of the present disclosure is to provide a compiler adapted in a graphics processing unit and a non-transitory computer-readable storage medium.

To achieve the aforementioned objectives, the present disclosure provides a compiler adapted in a graphics processing unit for general purpose, which is configured to compile an application program executed by the graphics processing unit to generate a machine code corresponding to the application program for execution by a plurality of stream multiprocessors of the graphics processing unit. The compiler includes a front-end module, an optimization module, and a back-end module. The front-end module is configured to perform a pre-processing on a source code corresponding to the application program to generate an intermediate code. The optimization module is configured to perform an optimization processing on the intermediate code. The back-end module is configured to perform a translation processing on the optimized intermediate code to generate the machine code. The optimization processing includes translating each branch instruction in the intermediate code into performing the following operations: establishing a post dominator tree for the branch instruction to find an immediate post dominator of the branch instruction serving as a reconverge point of instructions of a first path and a second path of the branch instruction; and inserting a specific instruction at the front end of the reconverge point, so as to jump to execute the instructions of the second path of the branch instruction when the instructions of the first path of the branch instruction are executed, once the specific instruction on the first path is executed, wherein the instructions following the reconverge point is not executed until the specific instruction on the second path is executed.

In one embodiment of the present disclosure, the branch instruction is executed by a plurality of stream processors comprised in issued one of the stream multiprocessors simultaneously, wherein the instructions of the first path are executed by a plurality of first stream processors and a plurality of second stream processors of the stream processors simultaneously by using a first lane mask, and the instructions of the second path are executed by the first stream processor and the second stream processors simultaneously by using a second lane mask.

In one embodiment of the present disclosure, once the specific instruction on the first path is executed, only the results of the execution by the first stream processors are stored, and once the specific instruction on the second path is executed, only the results of the execution by the second stream processors are stored.

In one embodiment of the present disclosure, when the instructions of the first path of the branch instruction are executed, once the specific instruction is executed, the use of the first lane mask is ended; and when the instructions of the second path of the branch instruction are executed, once the specific instruction is executed, the use of the second lane mask is ended.

In one embodiment of the present disclosure, the optimization processing further includes translating each call instruction in the intermediate code into performing the following operation: inlining all contents of the function called by the call instruction directly in the caller using the call instruction.

In one embodiment of the present disclosure, the optimization processing further includes translating each loop instruction in the intermediate code into performing the following operations: analyzing the number of the loops for the loop instruction; and unrolling all instructions executed in the loop instruction according to the number of the loops.

In one embodiment of the present disclosure, the front-end module is a clang compiler, which is configured to generate the intermediate code defined by a low level virtual machine (LLVM).

In one embodiment of the present disclosure, the pre-processing includes macro processing, static analysis, and generating a syntax tree corresponding to the source code.

The present disclosure further provides a non-transitory computer-readable storage medium, which is configured to store a plurality of instructions, the instructions are executed by a processor in a computer system so that the processor executes a compiling method to compile an application program executed by a graphics processing unit in the computer system to generate a machine code corresponding to the application program for execution by a plurality of stream multiprocessors of the graphics processing unit, wherein the compiling method includes: performing a pre-processing on a source code corresponding to the application program to generate an intermediate code; performing an optimization processing on the intermediate code; and performing a translation processing on the optimized intermediate code to generate the machine code; wherein the optimization processing includes translating each branch instruction in the intermediate code into performing the following operations: establishing a post dominator tree for the branch instruction to find an immediate post dominator of the branch instruction serving as a reconverge point of instructions of a first path and a second path of the branch instruction; and inserting a specific instruction at the front end of the reconverge point, so as to jump to execute the instructions of the second path of the branch instruction when the instructions of the first path of the branch instruction are executed, once the specific instruction on the first path is executed, wherein the instructions following the reconverge point is not executed until the specific instruction on the second path is executed.

In the present disclosure, by optimizing the aforementioned branch-related instruction, call instruction and loop instruction in the compiling process, the software stack can effectively match the operation of the hardware, and greatly improve the overall performance, so as to provide a convenient open-source execution environment for developers.

DETAILED DESCRIPTION OF PREFERRED EMBODIMENTS

Reference will now be made in detail to embodiments of the present disclosure, examples of which are described herein and illustrated in the accompanying drawings.

Figure 1:
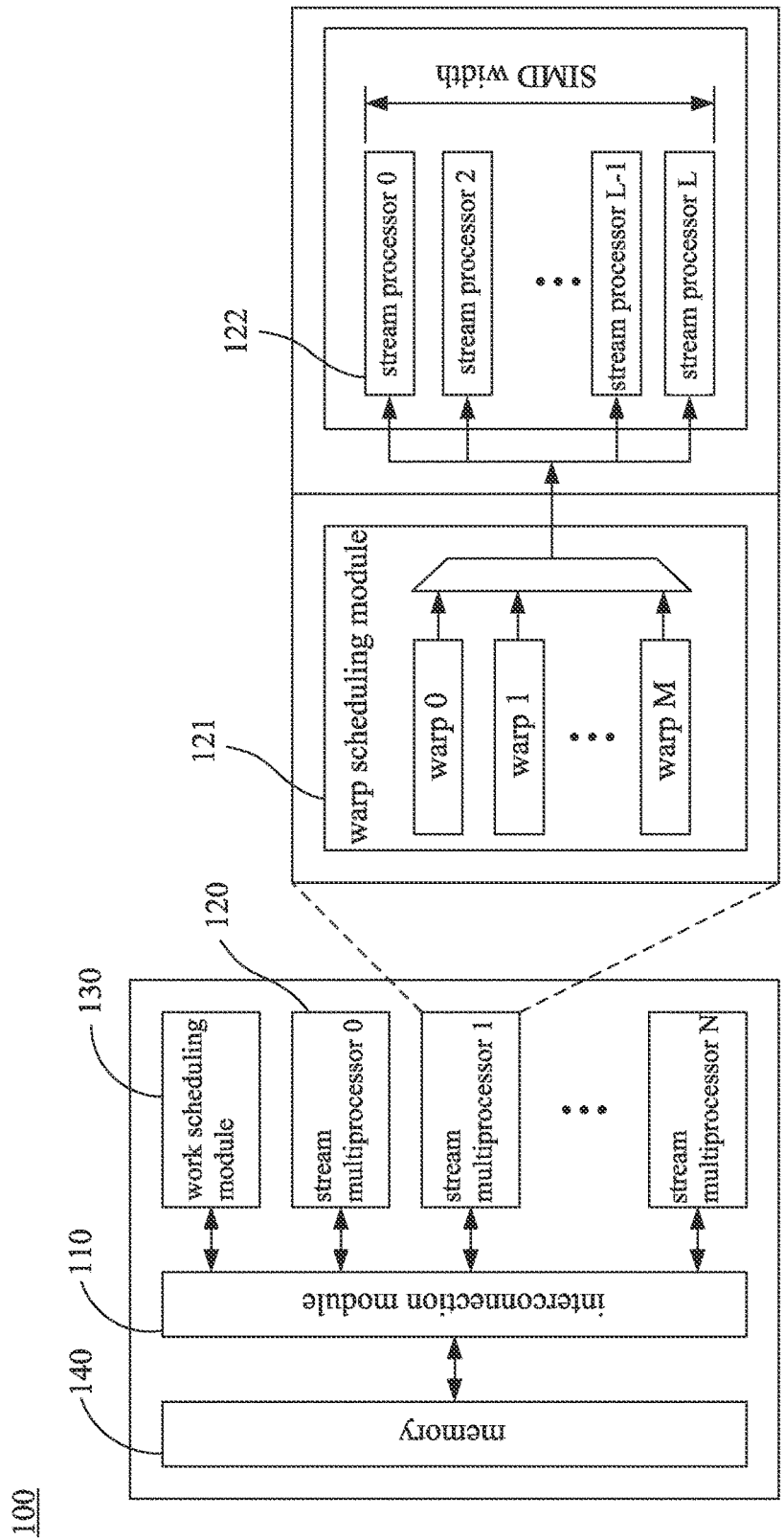
FIG. 1 is a block diagram of a graphics processing unit according to a preferred embodiment of the present disclosure.

Reference is made to FIG. 1. FIG. 1 is a block diagram of a graphics processing unit 100 according to a preferred embodiment of the present disclosure. GPU 100 is a single instruction multiple thread (SIMT) architecture, which includes an interconnection module 110, multiple stream multiprocessors (SMs) 120, a work scheduling module 130, and a memory 140. The interconnection module 110 is electrically connected to each stream multiprocessor 120, the work scheduling module 130, and the memory 140, and is configured to transmit data between these components. The stream multiprocessors 120 are configured to perform computations and execute instructions. Each stream multiprocessor 120 includes a warp scheduling module 121 and multiple stream processors (SP) 122, the functions thereof are described later. The work scheduling module 130 is configured to communicate with the external CPU (not shown), receive the work issued from the CPU, and schedule the work to the stream multiprocessor 120 for execution.

A thread is the smallest unit of a program executed by the GPU 100, and its scheduling is issued through two different scheduling modules, namely, the work group scheduling module 130 and the warp scheduling module 121. When the CPU issues a new work, the work scheduling module 130 receives the program to be executed in the unit of thread grid, cuts and schedules it, and then issues it to each stream multiprocessor 120 in the unit of thread block for execution. After receiving a thread block, a stream multiprocessor 120 divides a thread block into multiple warps according to the width of single instruction multiple data (SIMD), and perform computations in the unit of the warp. Multiple warps are scheduled by the warp scheduling module 121 and issued to each stream processor 122 for execution. Multiple threads in the same warp are executed simultaneously by the stream processors 122 of the stream multiprocessor 120. For example, if the stream multiprocessor 120 includes 32 stream processors 122 (i.e., the width of SIMD is 32), each warp has 32 threads as far as possible, which are executed by 32 stream processors 122 in parallel at the same time. If fewer than 32 threads are in one warp, some corresponding stream processors 122 do not work at the moment. It should be understood that the program running on a graphics processing unit is generally called a kernel, and a kernel corresponds to a thread grid. Each thread grid includes multiple thread blocks, and each thread block includes multiple threads.

Figure 2:
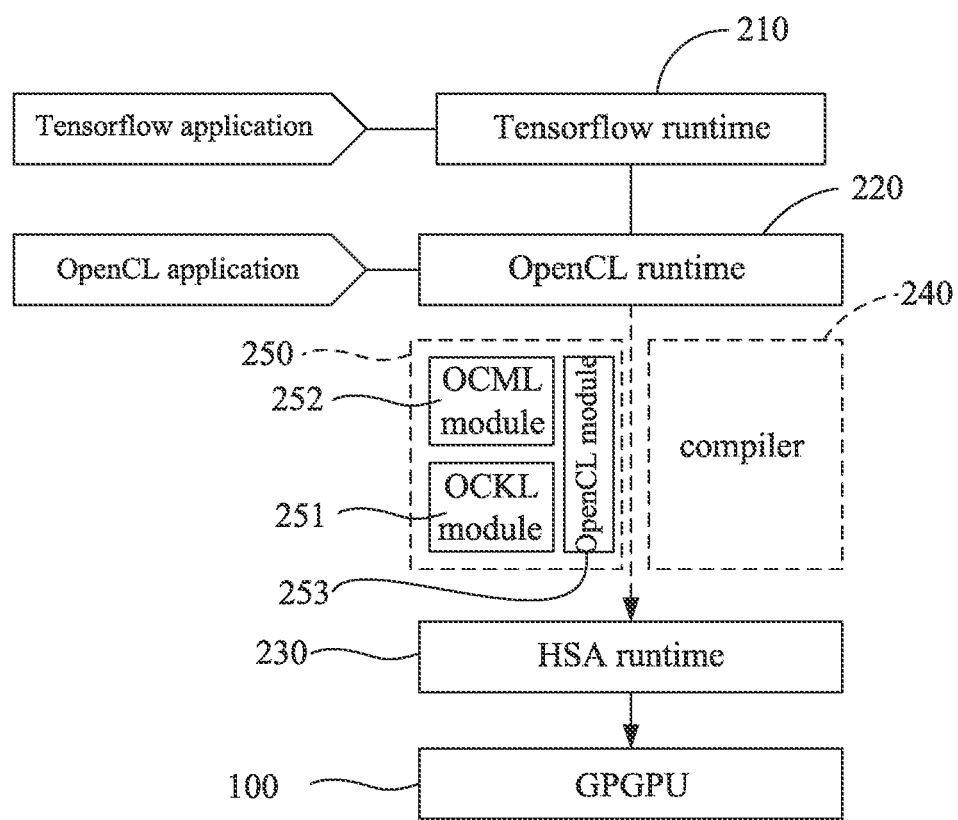
FIG. 2 is a schematic diagram of a software level of the general-purpose graphics processing unit according to a preferred embodiment of the present disclosure.

Reference is made to FIG. 2. FIG. 2 is a schematic diagram of the software level of the general-purpose graphics processing unit 100 according to a preferred embodiment of the present disclosure. As shown in FIG. 2, the top layer is a TensorFlow runtime 210, on which developers can use the application libraries supported by TensorFlow to support machine learning and deep learning model development. Next, OpenCL runtime 220 supports GPGPU 100 to achieve a large number of parallel computations to enhance performance. In other words, both TensorFlow CNN application and OpenCL application can achieve acceleration effect on GPGPU 100. Finally, the heterogeneous system architecture (HSA) runtime 230 provides a common hardware interface, which is a bridge established between hardware and software to communicate with the GPGPU 100, so as to reduce the design complexity of OpenCL runtime 220. After receiving the information from the software, the GPGPU 100 starts to run, and finally transmits the result back to the memory of the CPU to achieve the effect of program acceleration.

However, if the software level of the GPGPU 100 is not supported by the compiler, the whole system platform of the GPGPU 100 is unable to be established completely. Therefore, the compiler plays a very important role in the whole software and hardware system. In the present disclosure, the compiler 240 is an OpenCL LLVM compiler to support the GPGPU 100. The compiler 240 can optimize and customize its own instruction set, so as to achieve an effective cooperation between hardware and software and further improve the execution efficiency.

Specifically, for the TensorFlow runtime 210, in order to enable the TensorFlow applications to be executed under the OpenCL architecture, first it is necessary to understand the collocation scheme of the TensorFlow stream executor and the TF-Coriander. The TensorFlow stream executor is a common interface of the kernel application interface defined by Google for TensorFlow. In the architecture concept, the stream executor is used as the hardware abstraction layer of each target platform. The upper kernel application may perform the commands related to the resource management, such as memory allocation, instruction issue, and kernel process monitoring, on the virtual device through the common interface. Each platform developer can also put platform-related optimization programs into kernel implementation to optimize the execution efficiency of each kernel on the platform.

The native TensorFlow GPU Support only supports the GPU devices using CUDA programming language. For other platforms, developers need to design their own stream executors for the target platform. Since TensorFlow provides many kinds of kernel operations, much manpower may be cost to provide complete support for the platform, and synchronizing and maintaining TensorFlow may be difficult upon being updated. In order to reduce the complexity of the new hardware, a CUDA-on-CL architecture is proposed, which uses Coriander's source-to-source compiler to translate the native CUDA application program into the host code and device code that are able to be executed by the OpenCL device, so as to convert the native CUDA code of TensorFlow into OpenCL device kernel and design a stream executor for OpenCL, which is an independent branch of TensorFlow, that is, TF-Coriander.

TF-Coriander translates the CUDA code built in TensorFlow into OpenCL device kernel code through a coriander compiler, uses OpenCL libraries, such as clBLAST and DNN, to substitute for cuBLAST and cuDNN in CUDA, and establishes TensorFlow supporting OpenCL devices for OpenCL 1.2 devices.

In addition, for the HSA runtime 230, the modern computation platform is generally composed of heterogeneous hardware such as CPU, GPU or ASIC. Therefore, Apple proposes an open source language framework, that is, Open Computing Language (OpenCL). OpenCL provides a unified abstract software architecture and language for different hardware architectures, and uses the same application interface to connect with the target hardware for providing functions, such as device memory allocation, device kernel compilation and device code dispatching. In order to support each platform hardware, the OpenCL runtime is implemented in the form of shared library (Linux)/dynamic loadable Library (NT) in the software architecture. Each hardware developer may implement the application program interface for its hardware according to OpenCL specification.

OpenCL application architecture divides code into the host code and the device code (kernel). Most of the content executed by the host code is composed of C++ classes and runtime API provided by the OpenCL runtime. For the GPU/accelerator and other target devices, the OpenCL kernel code needs to be written separately, and the design for the dispatched kernel complies with OpenCL programming mode. OpenCL kernel code is a programming language based on C99, which provides parallel computing capability of task partition/data partition with kernel application program interface.

For the HSA runtime 230, in order to integrate hardware platforms with different architectures such as CPU, GPU, and DSP, HSA Foundation proposes a software architecture of heterogeneous system architecture (HSA). Similar to OpenCL, which provides a common parallel computing software development framework, HSA aims to provide a common hardware interface. Unlike OpenCL, which standardizes a unified application program development interface, HSA standardizes a unified hardware operation interface to simplify the development complexity of bridging interface between the upper layer (e.g., OpenCL) and the lower layer.

In the present embodiment, in order to provide the special computation instructions supported by OpenCL kernel application and GPGPU 100, it is necessary to provide a device library 250 additionally to cooperate with the compiler 240. The device library 250 includes an OCKL module 251, an OCML module 252, and an OpenCL module 253. The OCKL module 251 is configured to provide an application program interface including the related parameters (e.g., work item ID, thread block size, thread grid size, etc.) required by running the kernel. The OCML module 252 is configured to provide an application program interface related to mathematical calculations. The OpenCL module 253 is configured to provide an OpenCL kernel application interface corresponding to the functions of the OCKL module 215 and OCML module 252. Through the device library 250, the compiler 240 can provide the resources related to OpenCL kernel application interface for developers to use its internal special operation instruction set.

Figure 3:
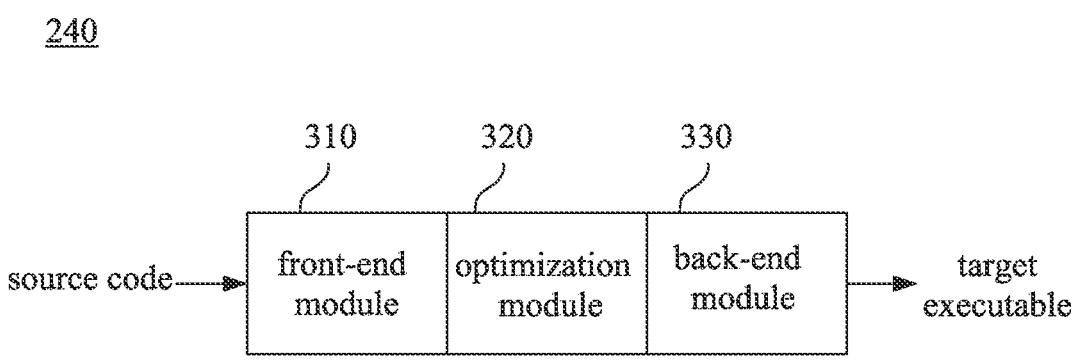
FIG. 3 is a block diagram of a compiler according to a preferred embodiment of the present disclosure.

Reference is made to FIG. 3. FIG. 3 is a block diagram of the compiler 240 according to a preferred embodiment of the present disclosure. The compiler 240 can be implemented as a computer program and stored in a storage device. The storage device includes non-transitory computer readable recording media or other devices having storage function. The computer program includes one or more computer-executable instructions. The computer-executable instructions may be executed by one or more processors to perform the compilation operations of the compiler 240. Specifically, the compiler 240 can be used in a general-purpose graphics processing unit in a computer system. The computer system comprises a central processing unit (CPU), the general-purpose graphics processing unit (GPGPU) and a memory connected with the CPU. The compiler 240 can be stored in the memory and executed by the CPU to compile the application program (e.g., the kernel written in OpenCL language) executed by the GPGPU 100 to generate the machine code (binary code) corresponding to the application program. The compiled machine code can be executed by the stream multiprocessors 120 of the GPGPU 100 as shown in FIG. 1, and the thread dispatch and execution are described as above and no further description is provided herein. The compiler 240 can be divided into a front-end module 310, an optimization module 320 and a back-end module 330. The front-end module 310 is configured to perform a pre-processing on the source code corresponding to the application program to generate an intermediate code (intermediate representation, IR). The optimization module 320 is configured to perform an optimization processing on the intermediate code. The back-end module 330 is configured to translate the optimized intermediary code into an assembly code, and call the assembler to translate the assembly code into the machine code.

In the present embodiment, the compiler 240 uses LLVM (low level virtual machine) architecture as the development platform. LLVM takes componentization as the design goal in the compiler architecture design, and divides each compiling function into individual corresponding sub modules. As a result, the core components of the compiler are able to be shared between different languages and different target architectures, in which the intermediate data transmission mechanism adopts the intermediate language defined by LLVM (LLVM-IR), which is a high level abstract intermediate code not associated with the platform and is able to be used by the front-end module 310 and the back-end module 330.

Specifically, the front-end module 310 is responsible for language-related processing. For example, the front-end module 310 can translate the source code to generate the internal-required abstract syntax tree (AST) data structure, pre-process the source code, and then translate the processed source code to generate the aforementioned LLVM-IR for the back-end module 330 to process. The pre-processing may include macro processing, static analysis, and so on. Macro processing includes the functions related to language specification, such as item expansion, constant term processing, and so on. Static analysis is to analyze the characteristics of the code, such as program size, the use of variables, program complexity, performance, and so on.

In the present embodiment, the front-end module 310 may be a Clang compiler to generate the corresponding LLVM-IR. In one embodiment, Clang can first perform the aforementioned pre-processing on the source code, and then translate the source code into the syntax tree defined by Clang (Clang AST) through token based Parser. After generating Clang AST, Clang can perform the language-related optimization on it and transform it into LLVM-IR.

The optimization module 320 can optimize LLVM-IR, such as constant pre-processing, conditional optimization and other language-dependent optimizations.

The back-end module 330 is configured to integrate the LLVM-IR instructions generated by the front-end module 310 and the optimization module 320, and generate the target-executable instructions and file formats. In other words, the back-end module 330 can translate the LLVM-IR to generate the machine code/file executable by the stream multiprocessor 120 of the GPGPU 100.

In the present disclosure, for some instructions included in the intermediate code (i.e., LLVM-IR), the optimization module 320 of the compiler 240 will further perform an optimization processing on them, as described below.

In one embodiment, when the intermediate code includes a "branch" instruction, the optimization module 320 can perform the optimization processing on it to translate it into the corresponding machine code performing the following operations: establishing a post dominator tree on the branch instruction to find an immediate post dominator of the branch instruction as the reconverge point of the instructions of the first path and the instructions of the second path of the branch instruction; and inserting a specific instruction (e.g., jump instruction) at the front end of the reconverge point, so as to jump to execute the instructions of the second path of the branch instruction rather than continuing to execute the remaining instructions following the reconverge point when the instructions of the first path of the branch instruction are executed, once the specific instruction on the first path is executed, wherein the remaining instructions following the reconverge point are not executed until the specific function on the second path is executed.

Figure 4:
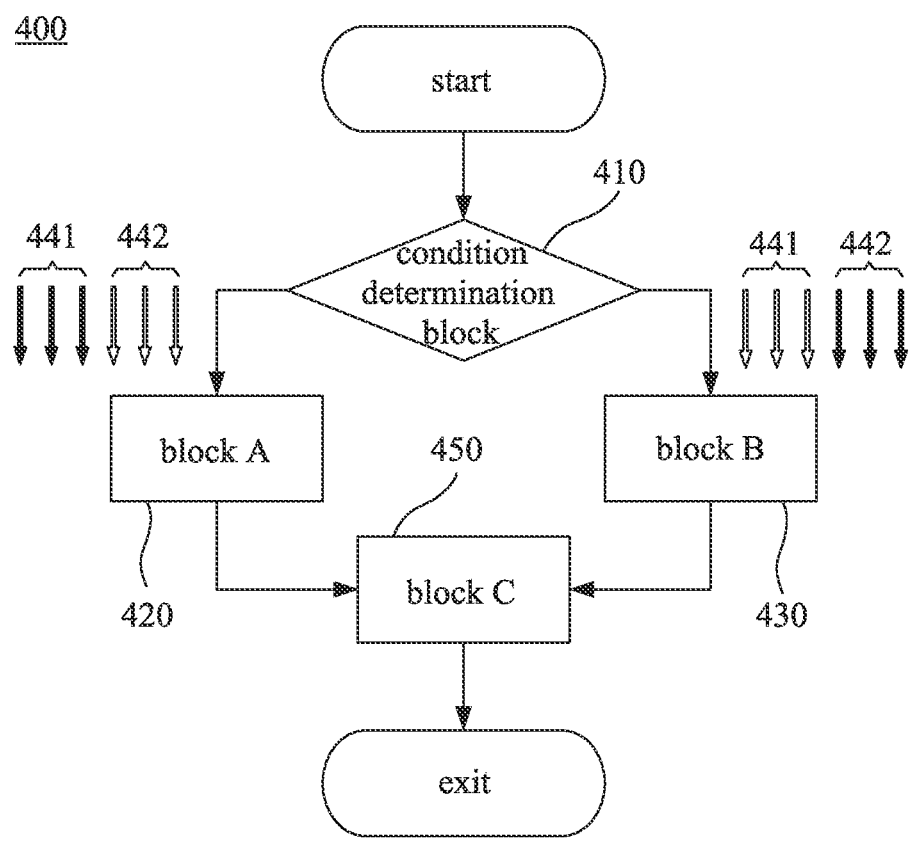
FIG. 4 is a schematic diagram of operation of a branch instruction according to an embodiment of the present disclosure.

Reference is made to FIG. 4. FIG. 4 is a schematic diagram of the operation of a branch instruction 400 according to an embodiment of the present disclosure. As shown in FIG. 4, the branch instruction means conditional execution of different operations. In the condition determination block 410, if the condition A of executing block A 420 is met, the execution will proceed along the first path where the block A 420 is located; if the condition B of executing the block B 430 is met, the execution proceeds along the second path where the block B 430 is located. As mentioned above, the GPGPU 100 adopts the SIMT architecture, and, that is, the same instruction is executed by multiple stream processors at the same time, but the data addresses are different. For the branch instruction, the target addresses after branching are different due to accessing different data, and thus the divergence occurs. Finally, since the targets of the lanes for the stream processors are different, they fail to run in SIMT manner. In the present embodiment, the GPGPU 100 executes the instruction at which the divergence occurs by using the masked execution mode. Specifically, the GPGPU 100 still executes divergent instructions in SIMT manner but uses the lane masks to determine which lanes (i.e., the channels for the warps issued from the warp scheduling module to the stream processors) are valid. Whether the execution results are written/stored in the cache/register/memory are determined according to the lane mask, and another lane mask is switched for the execution of another path after the present process is finished.

Take the branch instruction 400 in FIG. 4 as an example. In this example, it is assumed that there are 6 threads in the warp, in which 3 threads meet condition A and are executed by the stream processors that receive data through the lanes 441, while the other 3 threads meet condition B and are executed by the stream processors that receive data through the lanes 442. Therefore, for the stream multiprocessor who executes this warp, 6 stream processors connected to the lanes 441 and 442 still execute the instructions of the first path (including the block A 410 and the block C 450) for these 6 threads at the same time by using the first lane mask. Accordingly, after finishing the execution of the instructions of the first path, only the computation results of the data transmitted through the lanes 441 are written/stored in the cache/register/memory, while the computation results of the data transmitted through the lanes 442 are discarded. Then, these 6 stream processors connected to the lanes 441 and 442 continue to execute the instructions of the second path (including block B 420 and block C 450) at the same time but by using the second lane mask at the same time. Therefore, after finishing the execution of the instructions of the second path, only the computation results of the data transmitted through the lanes 442 are written/stored in the cache/register/memory, while the computation results of the data transmitted through the lanes 441 are discarded. In one embodiment, the first lane mask and the second lane mask may have a data structure with the number of bits corresponding to the number of lanes. Each bit corresponds to one lane, and whether the data corresponding to the lane is valid is determined according to the content of the bit. For example, in the first lane mask, 3 bits corresponding to the lanes 441 may all be high logic level, and 3 bits corresponding to the lanes 442 may all be low logic level. In the second lane mask, 3 bits corresponding to the lanes 441 may all be low logic level, and 3 bits corresponding to the lanes 442 may all be high logic level. In the lane mask, the computation results of the lanes corresponding to the bits with high logic level are valid, while the computation results of the lanes corresponding to the bits with low logic level are invalid and will not be written.

In the example of FIG. 4, it can be found that for the instruction with divergence, the instruction of the block C 450 in the first path and the second path is executed twice. If the instruction of block C 450 is a huge program, it will greatly affect the performance of the entire GPGPU.

Figure 5:
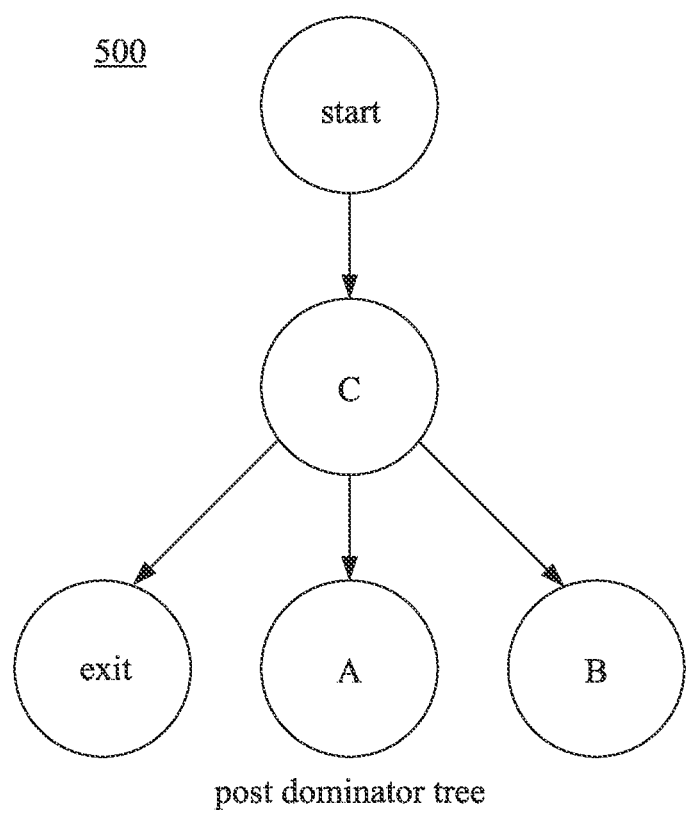
FIG. 5 is a schematic diagram of a post dominator tree established according to the branch instruction in FIG. 4.
Figure 6:
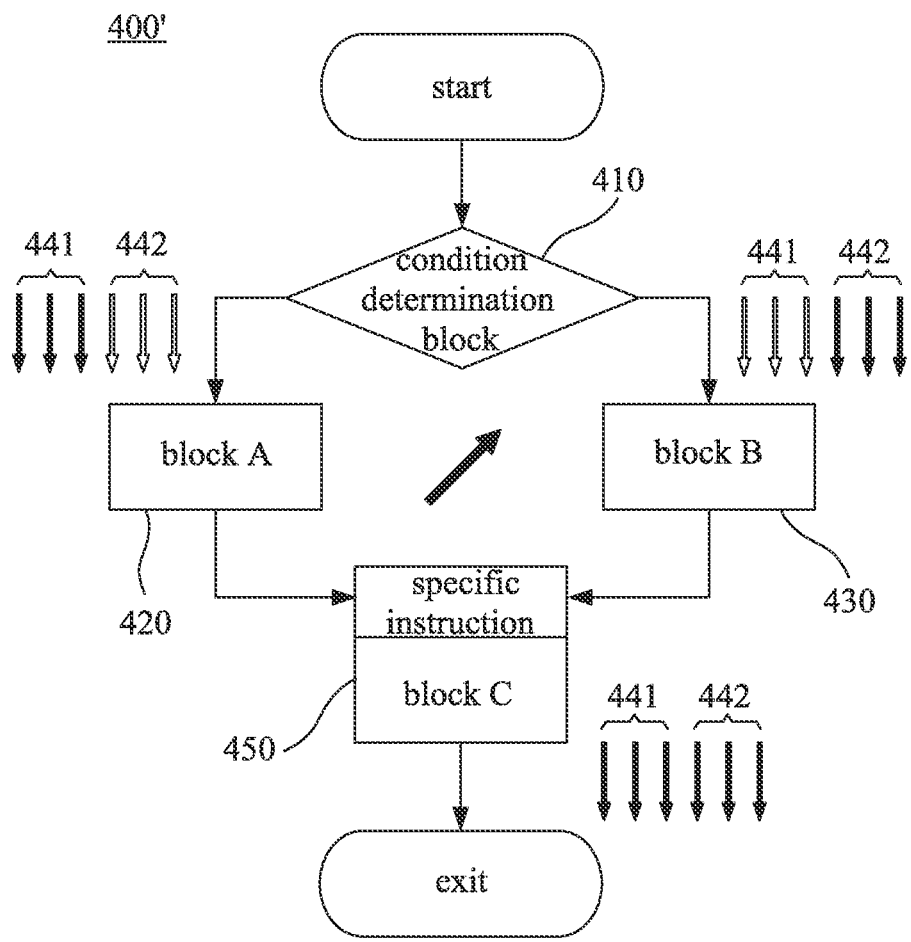
FIG. 6 is a schematic diagram of the corresponding operation after the branch instruction is translated according to a preferred embodiment of the present disclosure.

Reference is made to FIG. 5 in conjunction with FIG. 6. FIG. 5 is a schematic diagram of a post dominator tree 500 established according to the branch instruction 400 in FIG. 4, and FIG. 6 is a schematic diagram of the corresponding operation after the branch instruction 400 is translated according to a preferred embodiment of the present disclosure. In the present embodiment, when the compiler of the present disclosure finds that there is the branch instruction 400 in the intermediate code during the optimization processing, the compiler can perform a post dominator tree analysis on the branch instruction 400 and establish a post dominator tree 500 as shown in FIG. 5. From the post dominator tree 500, it can be found that all the post dominator (PDOM) and immediate post dominator (IPDOM) owned by the block A 420 and the block B 430 are the block C 450. Therefore, the block C 450 can be determined as the reconverge point after the branch instruction 400 diverges. Next, a specific instruction (e.g., jump instruction) can be inserted at the front end of the block C 450, so that when executing the instructions of block A 420 (i.e., the instructions of the first path) of the branch instruction 400 to the specific instruction, it turns to execute the instructions of block B 430 (i.e., the instructions of the second path) of the branch instruction 400 instead of the instructions of the block C 450, i.e., the remaining instructions following the reconverge point (including the instructions of the reconverge point) on the first path. When executing the instructions of the block B 430 to the specific instruction, the divergence of the branch instruction can be ended. At this moment, the lane mask can be removed, so that the instructions following the specific instruction (i.e., the instructions of the block C 450) can be executed simultaneously by the stream processors connected to the lanes 441 and 442. Therefore, repeated execution is avoided and the efficiency and operation capability of GPGPU 100 are further improved.

In one embodiment, when the intermediate code includes a "call" instruction, the optimization module 320 can perform the optimization processing on the call instruction to translate it into the corresponding machine code to perform the following operations: inlining all the contents of the function called by the call instruction directly in the caller using the call instruction function. Since the call instruction results in the complex divergence problem, the hardware cost is increased, and the efficiency is diminished. Therefore, when the compiler 240 of the present disclosure processes the call-related instructions, the designated function body may be directly inserted into and replace every place where the function is called, and, that is, the contents of the called function may be directly inlined inside the caller, so as to avoid the divergence and save the extra time brought by each call function.

In one embodiment, when the intermediary code includes a "loop" instruction (e.g., "loop" instruction, "for" instruction, etc.), the optimization module 320 can perform the optimization processing on the loop instruction to translate it into the corresponding machine code to perform the following operations: analyzing the number of the loops for the loop instruction; and unrolling all the instructions executed in the loop instruction according to the number of the loops. The branch instruction results in the divergence. Therefore, the stream multiprocessor blocks the dispatch of all instructions following the branch instruction when facing the branch instruction. The stream multiprocessor does not execute the branch instruction until the instructions in the pipeline are all completed, and does not continue to dispatch the following instructions until jumping to the designated target, which results in the decrease of pipeline efficiency. In order to reduce the number of the instructions required by the branch instructions, the loop unrolling method is used in the present embodiment to unroll all instructions in the loop instruction by the number of the loops thereof on the condition of available resources, so as to reduce the proportion of the branch instructions in the loop instruction during execution.

To sum up, the general graphics processing unit provided by the present disclosure designs the runtime for the graphics processing unit and the corresponding OpenCL LLVM compiler according to the OpenCL specification, so as to provide an application program interface conforming to and supporting OpenCL/TensorFlow. Moreover, by optimizing the aforementioned branch-related instructions, call instructions and loop instructions in the compiling process, the software stack can better match the operation of the hardware, and greatly improve the overall performance, so as to provide a convenient open-source execution environment for developers.

Although the present disclosure has been disclosed by way of preferred embodiments, the above preferred embodiments are not intended to limit the present disclosure, and one of ordinary skill in the art, without departing from the spirit and scope of the invention, the scope of protection of the present disclosure is defined by the scope of the claims.

What is claimed is:

1. A compiling method for compiling an application program executed by a graphics processing unit to generate a machine code corresponding to the application program for execution by a plurality of stream multiprocessors of the graphics processing unit, wherein the compiling method comprises steps:
    performing a pre-processing on a source code corresponding to the application program to generate an intermediate code;
    performing an optimization processing on the intermediate code; and
    performing a translation processing on the optimized intermediate code to generate the machine code;
    wherein the optimization processing comprises translating each branch instruction in the intermediate code into performing following operations:
    establishing a post dominator tree for the branch instruction to find an immediate post dominator of the branch instruction serving as a reconverge point of instructions of a first path and a second path of the branch instruction; and
    inserting a specific instruction at a front end of the reconverge point, so as to jump to execute the instructions of the second path of the branch instruction when the instructions of the first path of the branch instruction are executed,
    once the specific instruction on the first path 1s executed, wherein the instructions following the reconverge point is not executed until the specific instruction on the second path is executed;

wherein the optimization processing further comprises translating each call instruction in the intermediate code into performing following operation:

inlining all contents of the function called by the call instruction directly in the caller using the call instruction;

wherein the optimization processing further comprises translating each loop instruction in the intermediate code into performing following operations;

analyzing a number of the loops for the loop instruction; and unrolling all instructions executed in the loop instruction according to the number of the loops;

wherein once the specific instruction on the first path is executed, only results of the execution by the first stream processors are stored, and once the specific instruction on the second path is executed, only results of the execution by the second stream processors are stored.

2. The compiling method of claim 1, wherein the branch instruction is simultaneously executed by a plurality of first and second stream processors comprised in issued one of the stream multiprocessors, wherein the instructions of the first path are simultaneously executed by a plurality of first stream processors and a plurality of second stream processors of the stream processors by using a first lane mask, and the instructions of the second path are simultaneously executed by the first stream processor and the second stream processors by using a second lane mask.

3. The compiling method of claim 2, wherein when the instructions of the first path of the branch instruction are executed, once the specific instruction is executed, use of the first lane mask is ended; and when the instructions of the second path of the branch instruction are executed, once the specific instruction is executed, use of the second lane mask is ended.

4. The compiling method of claim 1, wherein the front-end module is a clang compiler, which is configured to generate the intermediate code defined by a low level virtual machine (LLVM).

5. The compiling method of claim 4, wherein the pre-processing comprises macro processing, static analysis, and generating a syntax tree corresponding to the source code.

6. A non-transitory computer-readable storage medium configured to store a plurality of instructions, the instructions are executed by a processor in a computer system so that the processor executes a compiling method to compile an application program executed by a graphics processing unit in the computer system to generate a machine code corresponding to the application program for execution by a plurality of stream multiprocessors of the graphics processing unit, wherein the compiling method comprises:

performing a pre-processing on a source code corresponding to the application program to generate an intermediate code;

performing an optimization processing on the intermediate code; and performing a translation processing on the optimized intermediate code to generate the machine code;

wherein the optimization processing comprises translating each branch instruction in the intermediate code into performing following operations:

establishing a post dominator tree for the branch instruction to find an immediate post dominator of the branch instruction serving as a reconverge point of instructions of a first path and a second path of the branch instruction; and inserting a specific instruction at a front end of the reconverge point, so that when the instructions of the first path of the branch instruction are executed, once the specific instruction on the first path is executed, it jumps to execute the instructions of the second path of the branch instruction, and the instructions following the reconverge point is not executed until the specific instruction on the second path is executed;

wherein the optimization processing further comprises translating each call instruction in the intermediate code into performing following operation:

inlining all contents of the function called by the call instruction directly in the caller using the call instruction;

wherein the optimization processing further comprises translating each loop instruction in the intermediate code into performing following operations;

analyzing a number of the loops for the loop instruction; and unrolling all instructions executed in the loop instruction according to the number of the loops;

wherein once the specific instruction on the first path is executed, only results of the execution by the first stream processors are stored, and once the specific instruction on the second path is executed, only results of the execution by the second stream processors are stored.

7. The non-transitory computer-readable storage medium of claim 6, wherein the branch instruction is simultaneously executed by a plurality of first and second stream processors comprised in issued one of the stream multiprocessors, wherein the instructions of the first path are simultaneously executed by a plurality of first stream processors and a plurality of second stream processors of the stream processors by using a first lane mask, and the instructions of the second path are simultaneously executed by the first stream processor and the second stream processors by using a second lane mask.

8. The non-transitory computer-readable storage medium of claim 7, wherein when the instructions of the first path of the branch instruction are executed, once the specific instruction is executed, use of the first lane mask is ended; and when the instructions of the second path of the branch instruction are executed, once the specific instruction is executed, use of the second lane mask is ended.

* * * * *